US010167359B2

(12) United States Patent
Maurin et al.

(10) Patent No.: US 10,167,359 B2
(45) Date of Patent: Jan. 1, 2019

(54) RADIATION CURING COATING COMPOSITION

(71) Applicant: Perstorp AB, Perstorp (SE)

(72) Inventors: Vanessa Maurin, Perstorp (SE); Paul Kelly, Sale (GB)

(73) Assignee: PERSTORP AB, Perstorp (SE)

( * ) Notice: Subject to any disclaimer, the term of this patent is extended or adjusted under 35 U.S.C. 154(b) by 0 days.

(21) Appl. No.: 15/532,637

(22) PCT Filed: Nov. 26, 2015

(86) PCT No.: PCT/SE2015/000072
§ 371 (c)(1),
(2) Date: Jun. 2, 2017

(87) PCT Pub. No.: WO2016/089271
PCT Pub. Date: Jun. 9, 2016

(65) Prior Publication Data
US 2017/0355807 A1    Dec. 14, 2017

(30) Foreign Application Priority Data

Dec. 4, 2014 (SE) ..................... 1400571

(51) Int. Cl.
| | |
|---|---|
| C08F 2/46 | (2006.01) |
| C08F 2/50 | (2006.01) |
| C08G 61/04 | (2006.01) |
| C08G 18/42 | (2006.01) |
| C09D 4/00 | (2006.01) |
| C08G 18/81 | (2006.01) |
| C09D 133/14 | (2006.01) |
| C08F 220/18 | (2006.01) |
| C08G 18/48 | (2006.01) |
| C08G 18/67 | (2006.01) |
| C08G 18/75 | (2006.01) |
| C08G 18/08 | (2006.01) |
| C08G 18/10 | (2006.01) |
| C09D 175/16 | (2006.01) |

(52) U.S. Cl.
CPC ........ *C08G 18/4277* (2013.01); *C08F 220/18* (2013.01); *C08G 18/0842* (2013.01); *C08G 18/10* (2013.01); *C08G 18/4825* (2013.01); *C08G 18/4833* (2013.01); *C08G 18/4887* (2013.01); *C08G 18/6755* (2013.01); *C08G 18/755* (2013.01); *C08G 18/8175* (2013.01); *C09D 4/00* (2013.01); *C09D 133/14* (2013.01); *C09D 175/16* (2013.01)

(58) Field of Classification Search
CPC ............ C08G 18/4277; C08G 18/8175; C09D 133/14; C08F 220/18
USPC ........ 522/6, 1, 71, 189, 184; 520/1
See application file for complete search history.

(56) References Cited

U.S. PATENT DOCUMENTS

| | | | |
|---|---|---|---|
| 5,422,421 A | 6/1995 | Hovestadt | |
| 2001/0038917 A1 | 11/2001 | Weikard | |
| 2001/0051229 A1* | 12/2001 | Witt | C09D 4/06 |
| | | | 427/508 |
| 2003/0060588 A1 | 3/2003 | Jacobine | |
| 2004/0242831 A1 | 12/2004 | Tian | |
| 2006/0292379 A1 | 12/2006 | Ishihara | |
| 2007/0167600 A1 | 7/2007 | Rukavina | |
| 2008/0161443 A1 | 7/2008 | Lee | |
| 2009/0246534 A1 | 10/2009 | Staunton | |
| 2011/0112244 A1 | 5/2011 | Van Holen et al. | |
| 2013/0041072 A1 | 2/2013 | Sommer et al. | |
| 2014/0037874 A1 | 2/2014 | Subramanian | |

FOREIGN PATENT DOCUMENTS

| | | |
|---|---|---|
| CN | 102812062 A | 12/2012 |
| CN | 103555193 A | 2/2014 |
| CN | 104031232 A | 9/2014 |
| CN | 104797613 A | 7/2015 |
| EP | 0429668 A1 | 6/1991 |
| EP | 1845143 A1 | 10/2007 |
| JP | 62-146966 | 6/1987 |
| JP | 06-206974 | 7/1994 |
| JP | 2013001897 A | 1/2013 |
| KR | 20140113766 A | 9/2014 |
| WO | WO-2014/081004 A1 | 5/2014 |
| WO | 2014-156581 | * 10/2014 |

(Continued)

OTHER PUBLICATIONS

Maki, WO 2014-156581 Machine Translation, Oct. 2, 2014 (Year: 2014).*

(Continued)

*Primary Examiner* — Jessica Whiteley
(74) *Attorney, Agent, or Firm* — Polsinelli PC

(57) ABSTRACT

Disclosed is a UV-curing coating composition comprising (a) 40-70% by weight of at least one urethane (meth)acrylate being a product of a reaction between at least one polycaprolactone polyol (a1) and at least one adduct (a2), said adduct (a2) being a product of a reaction between at least one polyisocyanate (a3) and at least one hydroxyalkyl (meth)acrylate (a4), said polycaprolactone polyol (a1) being a product of a reaction between at least one polyalkoxylated polyol (a5) and at least one caprolactone monomer (a6), (b) 20-50% by weight of at least one reactive diluent having at least one olefinic carbon-carbon double bond, and (c) 0.5-10% by weight of at least one photoinitiator, and optionally (d) 1-15% by weight of at least one matting agent.

20 Claims, No Drawings

(56) References Cited

FOREIGN PATENT DOCUMENTS

WO     WO-2014/156814 A1    10/2014
WO     WO-2014156581 A1    10/2014

OTHER PUBLICATIONS

International Search Report for PCT/SE2015/000072.
Japanese Office Action dated Apr. 24, 2018 for corresponding JP Application No. 2017-529993 and English translation.

* cited by examiner

RADIATION CURING COATING COMPOSITION

The present invention refers to a UV-curing coating composition comprising (a) at least one urethane (meth) acrylate, being a reaction product between at least one polycaprolactone polyol comprising alkoxy units and at least one adduct between at least one polyisocyanate and at least one hydroxyalkyl (meth)acrylate, (b) at least one reactive diluent and (c) at least one photoinitiator and optionally (d) at least one matting agent.

Radiation curing coating compositions comprising urethane (meth)acrylates obtained from polycaprolactone and other polyester polyols are well known in the art. Despite of known technology, the art has not yet disclosed rapidly UV-curing coating compositions having good chemical resistance, flexibility and toughness, comprising urethane (meth)acrylates based on polycaprolactone polyols comprising alkoxy, such as ethoxy, propoxy and/or butoxy units. A problem with known in the art compositions is that they tend to produce protective and/or decorative films lacking in flexing properties, especially when comprising matting agent, such as haptic matting agents, implying cracking. It is therefore an object of the present invention to provide a coating composition yielding protective and/or decorative films, especially haptic films, with improved flexing properties without deteriorating hardness, resistance and other essential properties.

The soft-feel/haptic properties are often presented as a main criteria of high-quality coatings for electronic devices and automotive interior parts, but also often requested in many other applications for consumer goods and furniture. Plastic coatings is one of the main applications, but wood coatings and other applications generate interests as well. Haptic properties should in most cases be combined with high resistance especially towards chemicals (water, hand creams or insect repellents), and furthermore exhibit good to excellent scratch resistance.

The present inventors have, as a result of intensive research, been able to obtain soft films exhibiting good to excellent hardness, flexibility and resistance, by using a polycaprolactone polyol having alkoxy units as intermediate in production of urethane (meth)acrylates.

The coating composition according to the present invention is a UV-curing coating composition comprising (a) 40-70%, such as 50-60% or 40-50%, by weight of at least one urethane (meth)acrylate, (b) 20-50%, such as 30-40% or 40-50%, by weight of at least one reactive diluent having at least one olefinic carbon-carbon double bond, and (c) 0.5-10%, such as 1-10, 2-8% or 3-6%, by weight of at least one photoinitiator. Said urethane (meth)acrylate (a) is in preferred embodiments a product obtained in a reaction between (a1) at least one polycaprolactone polyol and (a2) at least one adduct between (a3) at least one polyisocyanate and (a4) at least one hydroxyalkyl (meth)acrylate. Said polycaprolactone polyol (a1) is in likewise preferred embodiments a product obtained in a reaction between (a5) at least one polyalkoxylated polyol and (a6) at least one caprolactone monomer, such as α-, β-, γ-, δ- or most preferably ε-caprolactone.

The urethane (meth)acrylate of the present invention can be produced according to any process known in art yielding urethane (meth)acrylates, for instance at a temperature of 50-70° C. in presence of an inhibitor, such as 4-methoxy phenol, butylated hydroxytoluene, hydroquinone, 2,6-dinitro-4-methylphenol or p-hydroxy anisole, a catalyst, such as stannous octoate, dibutyltin laurate or tin(II) 2-ethylhexanoate, and a solvent, such as toluene, benzene, xylene or the like.

The coating composition of the present invention comprises in certain preferred embodiments additionally (d) 1-15%, such as 1-10% or 5-10%, by weight, calculated on subtotal said components (a)-(c), of at least one matting agent, such as a haptic matting agent. Suitable matting agents can be exemplified by, but not limited to, polyamides, such as polyamide 6, polyamide 11 and/or polyamide 12, micronised biopolymers, synthetic amorphous and optionally surface treated silicas, corpuscular crypto-cristalline amorphous silicas, lamellar kaolin and/or inorganically modified polyethylene wax dispersions.

Said polycaprolactone polyol (a1) has in preferred embodiments 2-10, such as 3-7 or 5-6 caprolactone units/molecule, a glass transition temperature (Tg) of less than −40° C., such as less −50° C. or even less than −60° C., and a molecular weight ($M_w$) of 1000-6000, such as 1500-5000 or 2000-4000, g/mol. The polycaprolactone polyol can be produced by any method known in the art wherein a caprolactone monomer and a polyol are subjected to ring opening and condensation at a temperature of for instance 160-220° C., such as 180-190° C. in presence of a catalyst known in the art, for instance a tin carboxylate, such as tin(II) laurate or tin(II) linear or branched octoate, dibutyltin laurate, dibutyltin acetate, stannous octoate, potassium isooctoate and/or zinc isooctoate. Preferred embodiments of said polyalkoxylated polyol (a5) include, but are not limited to, polyethoxylated, polypropoxylated and/or polybutoxylated diols, triols and polyols having 1-30, such as 1-20 or 2-10, ethoxy, propoxy and/or butoxy units/molecule, and can suitably be exemplified by polyethoxylated and/or polypropoxylated neopentyl glycol, glycerol, di-glycerol, trimethylolethane, trimethylolpropane, trimethylolbutane, di-trimethylolethane, di-trimethylolpropane, di-trimethylolbutane, pentaerythritol and di-pentaerythritol.

Said adduct (a2) is in preferred embodiments obtained at a molar ratio said polyisocyanate (a3) to said hydroxyalkyl (meth)acrylate (a4) of between 1 to 0.8 and 1 to 1, and in any process known in the art yielding adducts between isocyanates and unsaturated compounds, such as reactions at a temperature of 60-90° C. in presence of a catalyst, such as tin(II) laurate, tin(II) linear or branched octoate, dibutyltin laurate, dibutyltin acetate, stannous octoate, potassium isooctoate and/or zinc isooctoate, and an inhibitor, such as 4-methoxy phenol, butylated hydroxytoluene, hydroquinone, 2,6-dinitro-4-methylphenol and/or p-hydroxy anisole. The polyisocyanate (a3) is in these embodiments of the adduct (a2) suitably an aliphatic or cycloaliphatic di and/or triisocyanate, such as, but not limited to, hexamethylene diisocyanate, isophorone diisocyanate, dicyclohexyl methane diisocyanate, tetrahydrofuran diisocyanate, cyclohexylene diisocyanate, and/or nonane triisocyanate, and/or NCO-functional dimers, trimers and polymers thereof or therewith, such as biurets, isocyanurates and allophanates. Aromatic and unsaturated polyisocyanates, such as toluene diisocyanate, diphenyl methane diisocyanate, xylene diisocyanate, naphthalene diisocyanate, phenylene diisocyanate, triphenyl methane triisocyanate and/or furan diisocyanate, and/or NCO-functional dimers, trimers and polymers thereof or therewith, can of course also be used. The hydroxyalkyl (meth)acrylate (a4) is, in these embodiments of the adduct (a2), preferably and suitably, but not limited to, hydroxyethyl (meth)acrylate, hydroxypropyl (meth)acrylate, trimethylolethane di(meth)acrylate, trimethylolpropane di(meth)acrylate, trimethylolbutane di(meth)acrylate and/or pentaerythritol tri(meth)acrylate. Crotonates (methyl acrylates) can of course also be used.

Embodiments of said reactive diluent (b) having at least one olefinic double bond include, but are not limited to, for instance mono, di or polyunsaturated species such as (meth) acrylate esters, vinyl(meth)acrylates, (meth)allyl (meth) acrylates, polyester (meth)acrylates, epoxy (meth)acrylates, urethane (meth)acrylates and melamine (meth)acrylates or corresponding crotonates. Said reactive diluent is suitably selected from the group consisting of (meth)acrylate esters of 2-alkyl-1,3-propanediols, 2,2-dialkyl-1,3-propanediols, 2-alkyl-2-hydroxyalkyl-1,3-propanediols, 2,2-dihydroxyalkyl-1,3-propanediols, polyalkoxylated 2-alkyl-1,3-propanediols, polyalkoxylated 2,2-dialkyl-1,3-propanediols, polyalkoxylated 2-alkyl-2-hydroxyalkyl-1,3-propanediol s and polyalkoxylated 2,2-dihydroxyalkyl-1,3-propanediols, wherein alkyl is $C_1$-$C_8$ linear or branched alkyl and polyalkoxylated is polyethoxylated, polypropoxylated and/or polybutoxylated having 1-30 alkoxy units/molecule. Said reactive diluent (b) can furthermore be exemplified, but not limited to, isobornyl (meth)acrylate, dipropylene glycol di(meth)acrylate, tripropyleneglycol di(meth)acrylate, hexanediol di(meth)acrylate and trimethylolpropane tri (meth)acrylate.

Said photoinitiator (c) is in embodiments suitably selected from the group consisting of benzoins and derivatives thereof, such as benzoin ethers, acetophenones and derivatives thereof, such as 2,2-diacetoxyacetophenone, 1,1-dimethoxy-1-hydroxyacetophenone, benzophenones and derivatives thereof, thioxanthones and derivatives thereof, anthraquinones, aroylcycloalcanols, such as 1-benzoylcyclohexanol, organophosphorus compounds, such as acylphosphine oxides, acylphosphines, and aminoalkyl phenones.

Further embodiments of the coating composition according to the present invention comprise additionally at least one pigment, filler and/or dye and/or an additive package comprising additives conventionally used in the art, including, but not limited to, flow/levelling agents, rheological agents, such as pyrogenic silica, reaction products comprising urea groups and being prepared from amines and polyisocyanates (so called "sag control agents"), inhibitors suppressing premature free-radical polymerisation, thermal free-radical initiators, catalysts, UV-absorbers, antioxidants, polymer micro-particles, such as silica micro-gels and/or nano-particles.

In a further aspect, the present invention refers to the use of a coating composition as herein disclosed for obtaining a decorative and/or protective topcoat comprising said components (a)-(c) or a haptic decorative and/or protective topcoat comprising components (a)-(d). Haptic properties can only be obtained using correct matting agents. However, binder properties are crucial to ensure good mobility and distribution of the matting agent. Flexibility, viscosity and reactivity, as obtained by the coating composition of the present invention, are thus crucial factors.

Without further elaboration, it is believed that one skilled in the art can, using the preceding description, utilise the present invention to its fullest extent. The following preferred specific embodiments are, therefore, to be construed as merely illustrative and not limitative in any way whatsoever. In the following Examples 1 and 2 illustrate preparation of embodiment polycaprolactone polyols (a1) from embodiments of compounds (a5) and (a6), an embodiment adduct (a2) from embodiments of compounds (a3) and (a4), Example 3 illustrates preparation of embodiment polyurethane acrylates (a) from embodiment compounds (a1) and (a2) prepared in Examples 1 and 2. Example 4 refers to preparation and evaluations of coating compositions, according to embodiments of the present invention, comprising embodiment components (a)-(c) prepared in Examples 1-3. Example 5 present a comparison between a coating composition according to an embodiment of the present invention and a similar coating composition wherein the caprolactone extended alkoxylate structure (a1) used as intermediate in preparation of an embodiment urethane acrylate (a) is replaced by a non-alkoxylated structure. Example 6 refers to preparation and evaluations of coating compositions, according to embodiments of the present invention, comprising embodiment components (a)-(c) prepared in Examples 1-3 with addition of matting agents (d).

EXAMPLE 1

Polycaprolactone polyols were produced by subjecting ε-caprolactone to reaction (ring opening and condensation) with either one of the alkoxylated trimethylolpropanes Polyol 3165™, Polyol 3380™ (Perstorp AB, Sweden) or with the propoxylated neopentyl glycol Polyol R2490™ (Perstorp AB, Sweden), having following properties:

| Polyol | 3165 | 3380 | R2490 |
| --- | --- | --- | --- |
| Hydroxyl functionality | 3 | 3 | 2 |
| Hydroxyl value (mg KOH/g) | 165 ± 25 | 380 ± 25 | 485 ± 25 |
| Molecular weight (g/mol) | 1 010 | 440 | 220 |
| Ethoxy units/molecule | 20 | 7 | — |
| Propoxy units/molecule | — | — | 2 | at molar ratios yielding polycaprolactone polyols having following properties:

| Caprolactone polyol | 1 | 2 | 3 | 4 | 5 |
| --- | --- | --- | --- | --- | --- |
| Caprolactone units/molecule | 2.6 | 5.2 | 3.9 | 6.1 | 6.8 |
| Calc. molecular weight (g/mol) | 2 010 | 3 022 | 1 957 | 2 826 | 1 993 |
| Acid value (mg KOH/g) | 0.10 | 0.09 | 0.09 | 0.06 | 0.14 |
| Hydroxyl number (mg KOH/g) | 84 | 56 | 86 | 60 | 56 |
| Colour (Hazen) | 287 | 157 | 117 | 45 | 162 |
| Viscosity at 60° C. (mPas) | 214 | 429 | 296 | 620 | 450 |
| Tg - DSC (° C.) | −67 | −64 | −65 | −63 | −66 |
| Melting point (° C.) | 31 | 37 | 34 | 41 | 45 |

The reactions were performed at 180-190° C. in presence of a tin carboxylate as catalyst and monitored by GC determination of residual ε-caprolactone. The reactions were terminated when the amount of residual ε-caprolactone was close to zero.

EXAMPLE 2

An adduct between isophorone diisocyanate and 2-hydroxyethyl acrylate was produced, at 65-70° C. using 4-methoxyphenol as inhibitor and dibutyltin laurate as catalyst, at a molar ratio said diisocyanate to said acrylate of 1.0 to 0.95.

EXAMPLE 3

Urethane acrylates were produced by reacting a polycaprolactone polyol obtained in Example 1 and the adduct obtained in Example 2 at a molar ratio hydroxyl groups to isocyanate groups of 1.0 to 0.9. The reaction was performed at 60° C. using butylated hydroxytoluene as inhibitor, dibutyltin laurate as catalyst and toluene as solvent. The reaction was monitored by analysing the NCO-content and stopped when the NCO-value was close to zero. Products having following properties were yielded:

| Urethane acrylate | A | B | C | D | E |
|---|---|---|---|---|---|
| Used polycaprolactone polyol | 1 | 2 | 3 | 4 | 5 |
| Calc. molecular weight (g/mol) | 10 600 | 16 500 | 10 800 | 15 200 | 10 600 |
| C═C concentration (meq/g) | 1.07 | 0.81 | 1.07 | 0.82 | 0.66 |
| Viscosity at 25° C. (Pas) | 260 | 320 | 470 | 450 | Solid |
| Viscosity at 70° C. (Pas) | 7 | 11 | 9 | 11 | 7 |
| Tg by DSC (° C.) | −39 | −48 | −35 | −46 | −50 |

C═C concentration: Determined using FTIR spectroscopy.
Tg (glass transition temperature) by DSC: Determined on a Mettler DSC. 10 mg sample was analysed in a 40 μL aluminium pan. Temperature range from −100 to +120° C. Ramp 10° C./min.

EXAMPLE 4

UV-curing coatings were prepared by mixing 44.8 parts by weight of urethane acrylate A, B, C or D obtained in Example 3, 49.7 parts by weight of tripropylene glycol diacrylate as reactive diluent and 5.5 parts by weight of Irgacure® 1173 (BASF AG) as photoinitiator. Obtained coatings were coated on glass and aluminium panels using a K-bar yielding a wet film having a thickness of 30-40 μm. Curing was performed under a H vapour lamp (Fusion F600 max. 240 W/cm) at a UV dose of 5-6 J/cm². The cured films exhibited following properties:

| Coating | I | II | III | IV |
|---|---|---|---|---|
| Used urethane acrylate | A | B | C | D |
| Hardness (König secs) | 43 | 38 | 43 | 42 |
| Erichsen flexibility (mm) | 4.8 | 4.3 | 4.5 | 3.8 |
| Acetone spot test (2 min.) | No marking | No marking | No marking | No marking |
| MEK double rubs | 23 | 15 | 41 | 26 |
| Tg by DMA (° C. max E″) | −31 | −44 | −25 | −31 |

MEK (methyl ethyl ketone) double rubs: Evaluation according to ASTM D4752.
Acetone spot test: Evaluation according to SS 83 91 18.
Tg by DMA (° C. max E″): Determined using a Mettler DMA, in tension mode, at a temperature range from −100 to 150° C. (ramp 3° C./min). Amplitude and frequency respectively equal to 15 μm and 1 Hz. Three specimens of each sample were tested and the average value was reported.

EXAMPLE 5

UV-curing coatings were prepared by mixing either 44.8 parts by weight of urethane acrylate C, obtained in Example 3, or 44.8 parts by weight of a urethane acrylate wherein the polyalkoxylated trimethylolpropane (Polyol 3380™) used in the polycaprolactone polyol was replaced by non-alkoxylated trimethylolpropane, 49.7 parts by weight of dipropylene glycol diacrylate as reactive diluent and 5.5 parts by weight of Irgacure® 1173 (BASF AG) as photoinitiator. Obtained coatings were coated on glass and aluminium panels and cured as in Example 4. The cured films exhibited following properties:

| Coating | V Embodiment | VI Comparative |
|---|---|---|
| Viscosity at 23° C. (Pas) | 0.9 | 2.7 |
| Hardness (König secs) | 68 | 84 |
| Acetone spot test (2 min.) | No marking | No marking |
| MEK double rubs | 55 | 83 |
| Tg by DMA (° C. max E″) | −25 | 19 |
| E′ by DMA at 130° C. (Mpa) | 42 | 40 |
| Mc (g/mol) | 270 | 275 |

MEK (methyl ethyl ketone) double rubs: Evaluation according to ASTM D4752.
Acetone spot test: Evaluation according to SS 839118.
Tg (° C. max E″) and E′ by DMA: Determined using a Mettler DMA, in tension mode, under a temperature range from −100 to 150° C. (ramp of 3° C./min). Amplitude and frequency respectively equal to 15 μm and 1 Hz. Three specimens of each sample were tested and the average value was reported.
Mc ∝ (3ρRT)/E′ wherein E′ is the storage modulus on the rubbery plateau (J · m$^{−3}$), ρ is the material density (kg · m$^3$) at T, R is the gas constant (8,314 J · mol$^{−1}$ · K$^{−1}$) and T the temperature at the rubbery plateau (K).

EXAMPLE 6

UV-curing coatings were prepared by mixing 44.8 parts by weight of either urethane acrylate A or C or 44.8 parts by weight of a 60/40 (by weight) mixture of urethane acrylates C and E, obtained in Example 3, 49.7 parts by weight of dipropylene glycol diacrylate as reactive diluent and 5.5 parts by weight of Irgacure® 1173 (BASF AG) as photoinitiator. Deuteron® UV RS20 (inorganically modified polyethylene wax dispersion, Deuteron GmbH) or Orgasol® 2001 UD NAT1 (polyamide 12, Arkema, France) was as matting agent and added to obtained compositions in an amount of 10% by weight calculated on said compositions. Obtained coatings were coated on glass and aluminium panels as in Example 4. The cured films exhibited following properties:

| Coating | VII-M | VIII-M | IX-M | X-M |
|---|---|---|---|---|
| Used urethane acrylate | A | C | C + E | C + E |
| Matting agent | Deuteron | Deuteron | Deuteron | Orgasol |
| Hardness (König secs) | 65 | 63 | 77 | 55 |
| Erichsen flexibility (mm) | 4.0 | 3.5 | 4.4 | 4.4 |
| Acetone spot test (2 min.) | No marking | No marking | No marking | No marking |
| MEK Double rubs | 42 | 60 | 56 | 130 |
| Surface feeling | Soft/ haptic | Soft/ haptic | Soft/ haptic | Soft/ haptic |

MEK (methyl ethyl ketone) double rubs: Evaluation according to ASTM D4752.
Acetone spot test: Evaluation according to SS 839118.

The invention claimed is:

1. A coating composition characterised in, that said coating composition is a UV-curing coating composition comprising:
    (a) 40-70% by weight of at least one urethane (meth)acrylate being a product of a reaction between at least one polycaprolactone polyol (a1) and at least one adduct (a2), said adduct (a2) being a product of a reaction between at least one polyisocyanate (a3) and at least one hydroxyalkyl (meth)acrylate (a4), and said polycaprolactone polyol (a1) being a product of a reaction between at least one polyalkoxylated polyol (a5) and at least one caprolactone monomer (a6),
    (b) 20-50% by weight of at least one reactive diluent having at least one olefinic carbon-carbon double bond, and
    (c) 0.5-10% by weight of at least one photoinitiator.

2. The coating composition according to claim 1 characterised in, that it additionally comprises:
    (d) 1-15% by weight, calculated on subtotal of said components (a) to (c), of at least one matting agent.

3. The coating composition according to claim 2 characterised in, that said matting agent (d) is a haptic matting agent.

4. The coating composition according to claim 2 characterised in, that said matting agent (d) is a polyamide, a micronised biopolymer, a synthetic amorphous and optionally surface treated silica, a corpuscular crypto-cristalline amorphous silica, lamellar kaolin and/or an inorganically modified polyethylene wax dispersion.

5. The coating composition according to claim 1 characterised in, that said polycaprolactone polyol (a1) has 2-10 caprolactone units/molecule.

6. The coating composition according to claim 1 characterised in, that said polycaprolactone polyol (a1) has a glass transition temperature (Tg) of less than −40° C.

7. The coating composition according claim 1 characterised in, that said polycaprolactone polyol (a1) has a molecular weight (Mw) of 1000-6000 g/mol.

8. The coating composition according to claim 1 characterised in, that said adduct (a2) is obtained at a molar ratio polyisocyanate (a3) to hydroxyalkyl (meth)acrylate (a4) of between 1 to 0.8 and 1 to 1.

9. The coating composition according to claim 1 characterised in, that said polyisocyanate (a3) is an aliphatic or cycloaliphatic di or triisocyanate and/or a a NCO-functional dimer, trimer or polymer thereof or therewith.

10. The coating composition according to claim 1 characterised in, that said polyisocyanate (a3) is hexamethylene diisocyanate, isophorone diisocyanate, dicyclohexyl methane diisocyanate, tetrahydrofuran diisocyanate, cyclohexylene diisocyanate and/or nonane triisocyanate, and/or a NCO-functional dimer, trimer or polymer thereof or therewith.

11. The coating composition according to claim 1 characterised in, that said hydroxyalkyl (meth)acrylate (a4) is hydroxyethyl (meth)acrylate, hydroxypropyl (meth)acrylate, trimethylolethane di(meth)acrylate, trimethylolpropane di(meth)acrylate, trimethylolbutane di(meth)acrylate and/or pentaerythritol tri(meth)acrylate.

12. The coating composition according to claim 1 characterised in, that said polyalkoxylated polyol (a5) is a polyethoxylated, polypropoxylated and/or polybutoxylated diol or triol having 1-30 ethoxy, propoxy and/or butoxy units/molecule.

13. The coating composition according to claim 1 characterised in, that said polyalkoxylated polyol (a5) is a polyethoxylated and/or polypropoxylated neopentyl glycol, glycerol, trimethylolethane, trimethylolpropane or trimethylolbutane.

14. The coating composition according to claim 1 characterised in, that said caprolactone monomer (a6) is ε-caprolactone.

15. The coating composition according to claim 1 characterised in, that said reactive diluent (b) is at least one alkyl (meth)acrylate, vinyl (meth)acrylate, (meth)allyl (meth)acrylate, polyester (meth)acrylate, epoxy (meth)acrylate, urethane (meth)acrylate and/or melamine (meth)acrylate.

16. The coating composition according to claim 1 characterised in, that said reactive diluent (b) is isobornyl (meth)acrylate, dipropylene glycol di(meth)acrylate, tripropyleneglycol di(meth)acrylate, hexanediol di(meth)acrylate and/or trimethylolpropane tri(meth)acrylate.

17. The coating composition according to claim 1 characterised in, that said photoinitiator (c) is a benzoin ether, an acylphosphine, an acetophenone, an aminoalkyl phenone, a benzophenone and/or an antraquinone.

18. The coating composition according to claim 1 characterised in, that it additionally comprises at least one pigment, filler and/or dye.

19. The coating composition according to claim 1 characterised in, that it additionally comprises at least one UV-stabiliser, flow/levelling agent, rheological agent, inhibitor and/or UV-absorber.

20. A method for obtaining a decorative and/or protective topcoat comprising applying a coating composition of claim 1 to a substrate.

* * * * *